(12) United States Patent (10) Patent No.: US 12,220,977 B2
Raeder (45) Date of Patent: Feb. 11, 2025

(54) DRIVE UNIT FOR A DRIVE AXLE OF A VEHICLE

(71) Applicant: ZF Friedrichshafen AG, Friedrichshafen (DE)

(72) Inventor: Niclas Raeder, Bermatingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 74 days.

(21) Appl. No.: 18/192,044

(22) Filed: Mar. 29, 2023

(65) Prior Publication Data

US 2023/0311629 A1 Oct. 5, 2023

(30) Foreign Application Priority Data

Mar. 30, 2022 (DE) ...................... 10 2022 203 098.2

(51) Int. Cl.
*B60K 17/16* (2006.01)
*B60K 1/02* (2006.01)
(Continued)

(52) U.S. Cl.
CPC ................ *B60K 1/02* (2013.01); *B60K 17/08* (2013.01); *B60K 17/16* (2013.01); *F16H 48/06* (2013.01)

(58) Field of Classification Search
CPC .......... B60K 1/02; B60K 17/08; B60K 17/16; B60K 17/046; F16H 48/06
See application file for complete search history.

(56) References Cited

U.S. PATENT DOCUMENTS 2,037,126 A 4/1936 Ford
5,879,265 A 3/1999 Bek
(Continued)

FOREIGN PATENT DOCUMENTS

CN 206749500 U 12/2017
CN 107985068 A 5/2018
(Continued)

OTHER PUBLICATIONS

German Patent Office, Search Report issued in German patent application No. 10 2022 209 050.0 (Jul. 24, 2023).
(Continued)

*Primary Examiner* — Tinh Dang
(74) *Attorney, Agent, or Firm* — Finch & Maloney PLLC

(57) ABSTRACT

The invention relates to a drive unit for a drive axle of a vehicle, comprising a first and a second electric machine, a differential with a differential input and two differential output shafts which are designed to be drivingly connected to a respective drive wheel of the drive axle, and a transmission. The transmission comprises a first transmission input shaft for connecting to the first electric machine, a second transmission input shaft for connecting to the second electric machine, a transmission output shaft for connecting to the differential, a first shifting unit with three shifting elements, a second shifting unit with two shifting elements, and two planetary gearsets coupled to one another. The differential is arranged with its axis parallel to the two electric machines and to the transmission, and the transmission output shaft is connected by a first spur gear stage to a differential input.

15 Claims, 5 Drawing Sheets

(51) Int. Cl.
*B60K 17/08* (2006.01)
*F16H 48/06* (2006.01)

(56) References Cited

U.S. PATENT DOCUMENTS

| | | |
|---|---|---|
| 6,557,656 B2 | 5/2003 | Haniu et al. |
| 7,220,203 B2 | 5/2007 | Holmes et al. |
| 7,363,996 B2 | 4/2008 | Kamada et al. |
| 7,387,585 B2 | 6/2008 | Bucknor et al. |
| 7,479,081 B2 | 1/2009 | Holmes |
| 7,594,869 B2 | 9/2009 | Holmes |
| 7,695,387 B2 | 4/2010 | Oba |
| 7,967,711 B2 | 6/2011 | Conlon et al. |
| 8,091,661 B2 | 1/2012 | Oba et al. |
| 8,512,187 B2 | 8/2013 | Puiu et al. |
| 9,566,857 B1 | 2/2017 | Pritchard et al. |
| 10,968,983 B2 | 4/2021 | Hara et al. |
| 11,002,350 B2 | 5/2021 | Waltz |
| 11,124,064 B2 | 9/2021 | Kaltenbach et al. |
| 11,156,280 B2 | 10/2021 | Kurth |
| 11,364,784 B2 * | 6/2022 | Kaltenbach ............ F16H 3/724 |
| 11,365,785 B2 | 6/2022 | Kumar et al. |
| 11,472,277 B2 | 10/2022 | Glückler et al. |
| 2006/0025263 A1 | 2/2006 | Sowul et al. |
| 2011/0259657 A1 | 10/2011 | Fuechtner |
| 2021/0188066 A1 | 6/2021 | McGrew et al. |
| 2021/0372506 A1 | 12/2021 | McGrew, Jr. et al. |
| 2022/0364631 A1 | 11/2022 | Glückler et al. |

FOREIGN PATENT DOCUMENTS

| | | | |
|---|---|---|---|
| CN | 208630340 U | 3/2019 | |
| DE | 1505723 | 7/1970 | |
| DE | 10 2011 088 647 A1 | 6/2013 | |
| DE | 10 2012 204 717 A1 | 9/2013 | |
| DE | 102012219125 A1 * | 4/2014 | ............ B60K 6/365 |
| DE | 10 2015 215 393 A1 | 9/2016 | |
| DE | 10 2018 001 508 B3 | 5/2019 | |
| DE | 10 2017 011 387 A1 | 6/2019 | |
| DE | 10 2020 203 669 A1 | 9/2021 | |
| DE | 10 2020 215 124 A1 | 6/2022 | |
| EP | 3587157 B1 * | 6/2021 | ............... B60K 1/00 |
| WO | 2019/115204 A1 | 6/2019 | |
| WO | 2021/063789 A1 | 4/2021 | |

OTHER PUBLICATIONS

United States Patent and Trademark Office, Office Action issued in U.S. Appl. No. 18/192,018 (Sep. 25, 2023).

German Patent Office, German Search Report issued in German patent application No. 10 2022 203 098.2 (Nov. 8, 2022).

German Patent Office, German Search Report issued in German patent application No. 10 2022 203 097.4 (Nov. 7, 2022).

United States Patent and Trademark Office, Non-Final Office Action issued in U.S. Appl. No. 17/764,824 (May 8, 2023).

* cited by examiner

DRIVE UNIT FOR A DRIVE AXLE OF A VEHICLE

RELATED APPLICATIONS

This application claims the benefit of and right of priority under 35 U.S.C. § 119 to German Patent Application no. 10 2022 203 098.2, filed on 30 Mar. 2022, the contents of which are incorporated herein by reference in its entirety.

FIELD OF THE DISCLOSURE

The invention relates to a drive unit for a drive axle of a vehicle, in particular for an electric axle drive. In addition, the invention relates to a vehicle with a drive axle which comprises such a drive unit.

BACKGROUND

For example, WO 2021/063789 A1 describes a drive axle of an electric vehicle with a first and a second drive wheel, a first and a second electric machine, a transmission with a transmission input shaft and a transmission output shaft, and an axle differential with a differential input and two differential output shafts. The first electric machine is connected to the transmission input shaft and the transmission output shaft is connected to the differential input. The second electric machine can be linked in, if necessary, as an additional drive.

SUMMARY

The purpose of the present invention is to provide an alternative drive unit for a drive axle of a vehicle. In particular, the drive unit should be compact and energy efficient. The objective is achieved by a drive unit having the features specified a drive unit for a drive axle of a vehicle as variously disclosed herein. Advantages and embodiments will be apparent from the description that follows and the figures.

A drive unit according to the invention for a drive axle of a vehicle comprises a first electric machine, a second electric machine, a differential with a differential input and two differential output shafts which are designed each to be connected to a respective drive wheel of the drive axle, and a transmission comprising a first transmission input shaft for connection to the first electric machine, a second transmission input shaft for connection to the second electric machine, a transmission output shaft for connection to the differential, a first shifting unit with a first shifting element, a second shifting element and a third shifting element, a second shifting unit with a fourth shifting element and a fifth shifting element, and two planetary gearsets coupled to one another, wherein the first planetary gearset comprises a first sun gear shaft, a first ring gear shaft and a first web shaft, wherein the second planetary gearset comprises a second sun gear shaft, a second ring gear shaft and a second web shaft, wherein the first web shaft is connected rotationally fixed to the second ring gear shaft, wherein the first sun gear shaft is connected rotationally fixed to the first transmission input shaft, wherein the first ring gear shaft is fixed and immobilized on a rotationally fixed component, wherein the second web shaft is connected rotationally fixed to the transmission output shaft, wherein by means of the first shifting element the second sun gear shaft can be connected rotationally fixed to a rotationally fixed component, wherein by means of the second shifting element two of the three shafts of the second planetary gearset can be connected rotationally fixed to one another, wherein by means of the third shifting element the second sun gear shaft can be connected rotationally fixed to the first transmission input shaft, wherein the differential is arranged with its axis parallel to the two electric machines and the transmission, and wherein the transmission output shaft is connected to the differential input by means of a first spur gear stage.

A "driving connection" is understood to mean a connection between two elements or between two devices or between an element and a device, which can be formed directly, i.e. without involving further elements and/or devices, or indirectly, i.e. by involving further elements and/or devices.

The transmission enables the connection of two electric machines for delivering drive power by way of the two transmission input shafts. The transmission is drivingly connected to the differential in the form of an axle differential, whereas the differential is designed to connect two output shafts, each provided in order to drive a respective drive wheel of the drive axle. In particular, the drive unit is used in an electric drive axle for an electric vehicle. The transmission has three gears, whereby high energy efficiency is achieved in particular for electric utility vehicles, and for this only two shifting units are needed.

A "shifting unit" is understood to be a device which, in at least one of its shift positions, connects two shafts to one another in a rotationally fixed manner and in another shift position decouples the shafts from one another so that they can rotate relative to one another. Thus, in a closed condition of a shifting element of the shifting unit two shafts are connected rotationally fixed to one another, whereas in an open condition of a shifting element or in a neutral position of the shifting unit the shafts can have different rotation speeds and/or different rotation directions. In particular, a shifting unit can comprise a plurality of shifting elements and can be designed for the connection of two shafts by interlock or by friction. Preferably the shifting elements are of the interlocking type, in which case the shifting unit is more compact and more efficient than a shifting unit with frictional shifting elements.

In the context of the invention a "shaft" is understood to be a rotatable component of the transmission by means of which respective associated components of the transmission are connected rotationally fixed to one another, or by means of which such a connection can be formed when one of the shifting elements is actuated. The shaft concerned can connect the components to one another axially or radially or even both axially and radially. Thus, the shaft concerned can also act as an intermediate element by which a component can for example be connected radially. Thus, the term "shaft" does not exclude that the components to be connected can be made integrally. In particular, two shafts connected rotationally fixed to one another can be made as one piece.

By way of the transmission output shaft the differential can be connected to the transmission and thus to the two electric machines. For that purpose, the transmission output shaft is drivingly connected via a first spur gear stage to the differential input. The first spur gear stage comprises a gearwheel arranged rotationally fixed on the transmission output shaft, which meshes with gearteeth formed rotationally fixed on the differential input, so producing an axial offset between the rotation axis of the transmission and the rotation axis of the differential. The size of the said axial offset can advantageously be adapted by way of the gearwheel diameter of the first spur gear stage, so that the transmission can be positioned freely in the tangential direction around the differential axis.

The first electric machine is connected by way of the first transmission input shaft. Preferably, the rotor shaft of the first electric machine is drivingly connected via a second spur gear stage to the first transmission input shaft. The second spur gear stage comprises a gearwheel arranged rotationally fixed on the first transmission input shaft, which meshes with a gearwheel formed rotationally fixed on the rotor shaft of the first electric machine, so producing an axial offset between the rotation axis of the transmission and the rotation axis of the first electric machine. The size of the axial offset can be adapted by way of the two gearwheel diameters of the second spur gear stage, so that the first electric machine can be positioned freely in the tangential direction around the transmission.

The second electric machine is connected by way of the second transmission input shaft. Preferably, the rotor shaft of the second electric machine is drivingly connected to the second transmission input shaft by means of a third spur gear stage. The third spur gear stage comprises a gearwheel arranged rotationally fixed on the second transmission input shaft, which meshes with a gearwheel formed rotationally fixed on the rotor shaft of the second electric machine, so producing an axial offset between the rotation axis of the transmission and the rotation axis of the second electric machine. The size of the axial offset can be adapted by way of the two gearwheel diameters of the second spur gear stage, so that the second electric machine can be positioned freely in the tangential direction around the transmission.

For example, on the respective web shaft of the planetary gearset, i.e. on the planetary carrier of the planetary gearset concerned, a plurality of planetary gearwheels are mounted to rotate on planetary bolts, the said planetary gearwheels meshing with the respective sun gear shaft and with the respective ring gear shaft. In particular, the second planetary gearset serves as a superimposition gear system, so that the drive power of the two electric machines are superimposed in the second planetary gearset and distributed by the differential to the drive wheels of the vehicle.

When two shafts of the second planetary gearset are connected rotationally fixed to one another, the second planetary gearset is blocked and thus rotates as a direct drive. Due to the blocking of the second planetary gearset by means of the second shifting element of the first shifting unit the gear ratio is i=1 regardless of the number of teeth of the elements meshing with one another. Expressed differently, the second planetary gearset rotates as a block. Preferably, the second planetary gearset is blocked by connecting the sun gear shaft of the second planetary gearset and the web shaft of the second planetary gearset by means of the first shifting unit.

By means of the first shifting element the second sun gear shaft can be connected to a rotationally fixed component. The said "rotationally fixed component" can preferably be a permanently immobile component of the transmission, preferably a housing of the transmission, part of such a housing, or a structural element connected rotationally fixed thereto. If an element of a transmission component such as an element of a planetary gearset is fixed permanently or temporarily by means of a shifting element to a rotationally fixed component, then it is permanently or temporarily prevented from moving in rotation. Consequently, in a first shift position of the first shifting unit the second sun gear shaft of the second planetary gearset is immobilized.

Preferably, to engage the first gear the first shifting element can be actuated, whereas to engage the second gear the second shifting element can be actuated and to engage the third gear the third shifting element can be actuated.

In a preferred embodiment the second spur gear stage and the third spur gear stage are arranged axially adjacent to one another. Consequently, there are no further components axially between the second spur gear stage and the third spur gear stage.

According to a preferred embodiment the second spur gear stage is arranged on a first axial end section of the transmission, while the third spur gear stage is arranged on a second axial end section of the transmission opposite the first one. Consequently, the second and third spur gear stages are axially as far apart as possible, with the two planetary gearsets, the two shifting units, and the first spur gear stage axially between the second and third spur gear stages.

In a preferred embodiment, by means of the fourth shifting element of the second shifting unit, the second transmission input shaft can be connected rotationally fixed to the second sun gear shaft and by means of the fifth shifting element of the second shifting unit the second transmission input shaft can be connected rotationally fixed to the first transmission input shaft, whereas in a neutral position of the second shifting unit the second transmission input shaft can be decoupled. In particular, the neutral position is an intermediate position between a closed position of the fourth shifting element and a closed position of the fifth shifting element of the second shifting unit.

According to a preferred embodiment, by means of the fourth shifting element of the second shifting unit, the second electric machine can be drivingly connected via a third spur gear stage to the second transmission input shaft, whereas by means of the fifth spur gear stage of the second shifting unit, the second electric machine can be drivingly connected via a fourth spur gear stage to the first transmission input shaft, and in a neutral position of the second shifting unit the rotor shaft of the second electric machine can be decoupled. Thus, the drive unit comprises four spur gear stages, two of the four spur gear stages being designed to connect the second electric machine.

In a preferred embodiment, the second shifting unit and the second electric machine have a common rotation axis, whereas the first transmission input shaft and the two planetary gearset are positioned with their axes parallel thereto. In particular, on the rotor shaft of the second electric machine are arranged respective gearwheels of the third and fourth spur gear stages in the form of loose wheels, and by means of the associated shifting element of the second shifting unit these can be connected rotationally fixed to the rotor shaft of the second electric machine.

According to a preferred embodiment, the two electric machines, the two planetary gearsets, and the two shifting units are arranged adjacent to one another in the axial direction on a common rotation axis, in such manner that the two planetary gearsets are arranged axially between one of the two shifting units and one of the two electric machines. For example, in an axial sequence the first electric machine is arranged axially adjacent to the second electric machine, the first planetary gearset is arranged axially adjacent to the first electric machine, the second planetary gearset is arranged axially adjacent to the first planetary gearset, the first spur gear stage is arranged axially adjacent to the second planetary gearset, the first shifting unit is arranged axially adjacent to the first spur gear stage, and the second shifting unit is arranged axially adjacent to the first shifting unit.

In a preferred embodiment the two electric machines have different rotation axes. In other words, the two electric machines are arranged with their axes parallel to one another.

According to a preferred embodiment, the first shifting unit comprises a sliding sleeve connected rotationally fixed to the sun gear shaft of the second planetary gearset, and this first sliding sleeve can be moved axially to the required shift position by a first actuator. Thus, the first actuator moves the first sliding sleeve on the sun gear shaft of the second planetary gearset to the required shift position. Preferably, the first sliding sleeve comprises claws which co-operate, with interlock, with respectively corresponding claw teeth in the respective gear positions, in particular in a first, third, and fifth shift position. Thus, it is understood that the respective claw teeth co-operate with interlock with the first sliding sleeve as a shifting element, i.e. as a first, second and third shifting element. In particular, in a respective neutral position of the first shifting unit the sliding sleeve is positioned axially between two gear positions of the first shifting unit, so that a change between the gears, specifically between the first, third and fifth gear positions of the first shifting unit always entails passing through a neutral position of the first shifting unit. Preferably, the first shifting unit comprises an unsynchronized claw clutch.

According to a preferred embodiment, the second shifting unit comprises a second sliding sleeve connected rotationally fixed to the second transmission input shaft, such that the second sliding sleeve can be moved axially to the required shift position by means of a second actuator. Thus, the second actuator moves the second sliding sleeve on the second transmission shaft to the shift position required. Preferably, the second sliding sleeve has claws which, in the first and second shift positions, co-operate with interlock with respectively corresponding claw teeth. Thus, it is understood that the respective claw teeth co-operate with interlock with the second sliding sleeve as a shifting element. In particular, in the neutral position of the second shifting unit the sliding sleeve is arranged axially between the first and second shift positions of the second shifting unit, so that a change between the first and second shift positions of the second shifting unit always entails passing through the neutral position of the second shifting unit. Preferably, the second shifting unit comprises an unsynchronized claw clutch.

In a preferred embodiment, the drive unit further comprises two fixed gear ratio steps for the driving connection of the respective differential output shafts to the respective drive wheels of the drive axle. In other words, the respective differential output shaft is drivingly connected by way of the respective fixed gear ratio step to the associated drive wheel. Preferably, each gear ratio step is in the form of a planetary gearset with a sun gear shaft, a ring gear shaft and a web shaft. In particular, the respective sun gear shaft of the gear ratio step concerned is designed for connection to the differential gear system, for example by way of an associated joint shaft which is connected rotationally fixed to the differential output shaft. In particular, the respective ring gear shaft of the gear ratio step concerned is fixed and immobilized on a housing, whereas the respective web shaft of the gear ratio step concerned is designed for connection to the drive wheel of the vehicle. A plurality of planetary gearwheels is mounted to rotate on the web shaft of the gear ratio step concerned.

According to a preferred embodiment the differential gear system is in the form of a bevel gear differential. A differential in the form of a bevel gear differential has two wheel-side drive output elements, specifically a first drive output gearwheel and a second drive output gearwheel. The two drive output gearwheels mesh in each case with a compensation element. The compensation elements are mounted in a differential cage to rotate about their respective axes. Each drive output gearwheel is connected rotationally fixed to an associated lateral shaft. The drive input to the differential takes place by way of the differential cage. The drive power delivered to the differential gear system, i.e. a rotation speed and a torque, is distributed to the lateral shafts and transferred into the drive wheels of the axle. The lateral shafts are designed to be functionally connected to the drive wheels of the vehicle. Each lateral shaft can be connected to its associated drive wheel directly, or indirectly by way of a joint, a joint shaft and/or a wheel hub.

The invention also relates to a vehicle comprising a drive axle with two drive wheels and a drive unit according to the invention, wherein the drive unit is attached permanently to the chassis of the vehicle and each drive wheel of the drive axle is drivingly connected to the differential. In other words, the two electric machines, the transmission and the differential are arranged in fixed positions on the chassis of the vehicle so that the drive power of the electric machines is transferred to the drive wheels by way of joint shafts. The joint shafts are designed to compensate relative movements between the drive wheels and the drive unit. Alternatively, the use of rigid shafts, i.e., a combination of the drive unit with a rigid axle, is also conceivable.

The above definitions and statements about technical effects, advantages and advantageous embodiments of the drive unit according to the invention also apply analogously to the vehicle according to the invention, in particular to the drive axle of the vehicle according to the invention.

BRIEF DESCRIPTION OF THE DRAWINGS

Advantageous embodiments of the invention, which are explained below, are illustrated in the drawings in which the same or similar elements are denoted by the same indexes, and which show.

DETAILED DESCRIPTION

Figure 1:
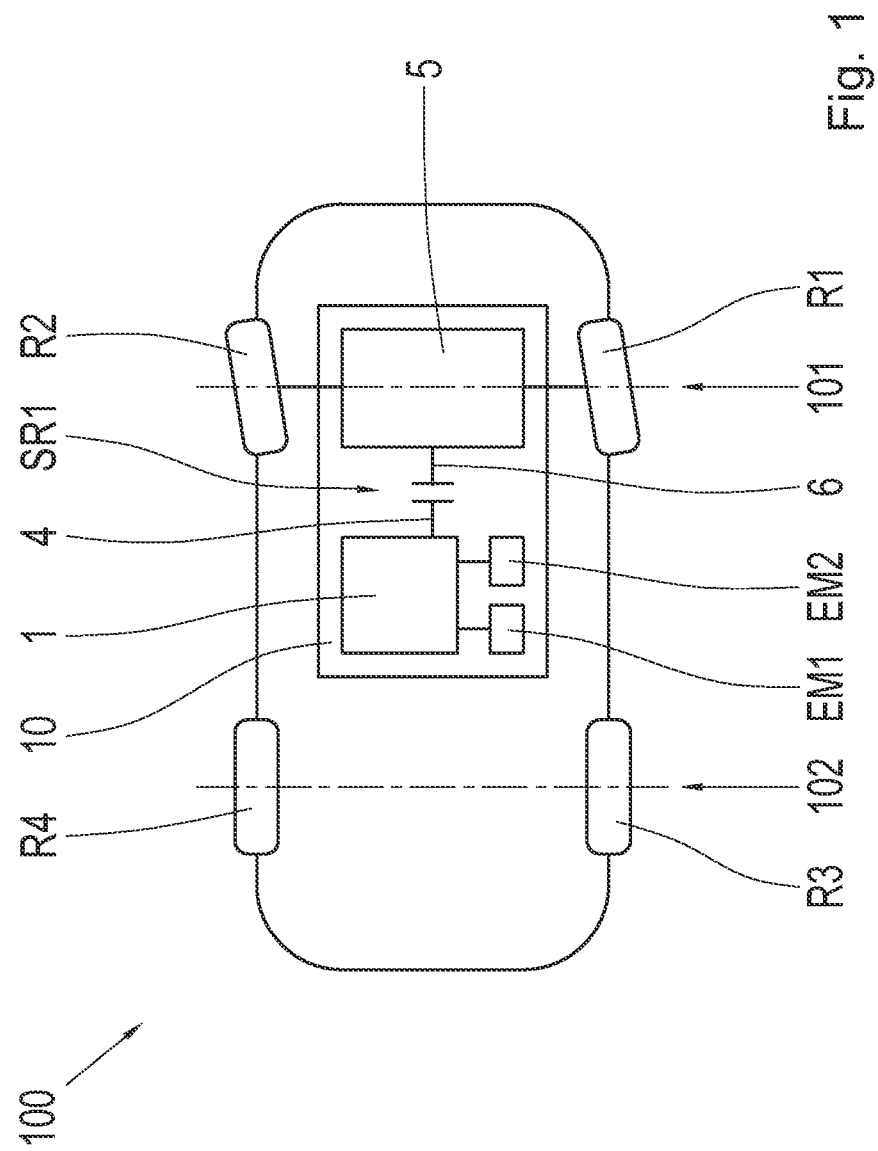
FIG. 1: A greatly abstracted schematic view of a vehicle with a drive axle, which comprises a drive unit according to the invention according to a first embodiment.
Figure 2:
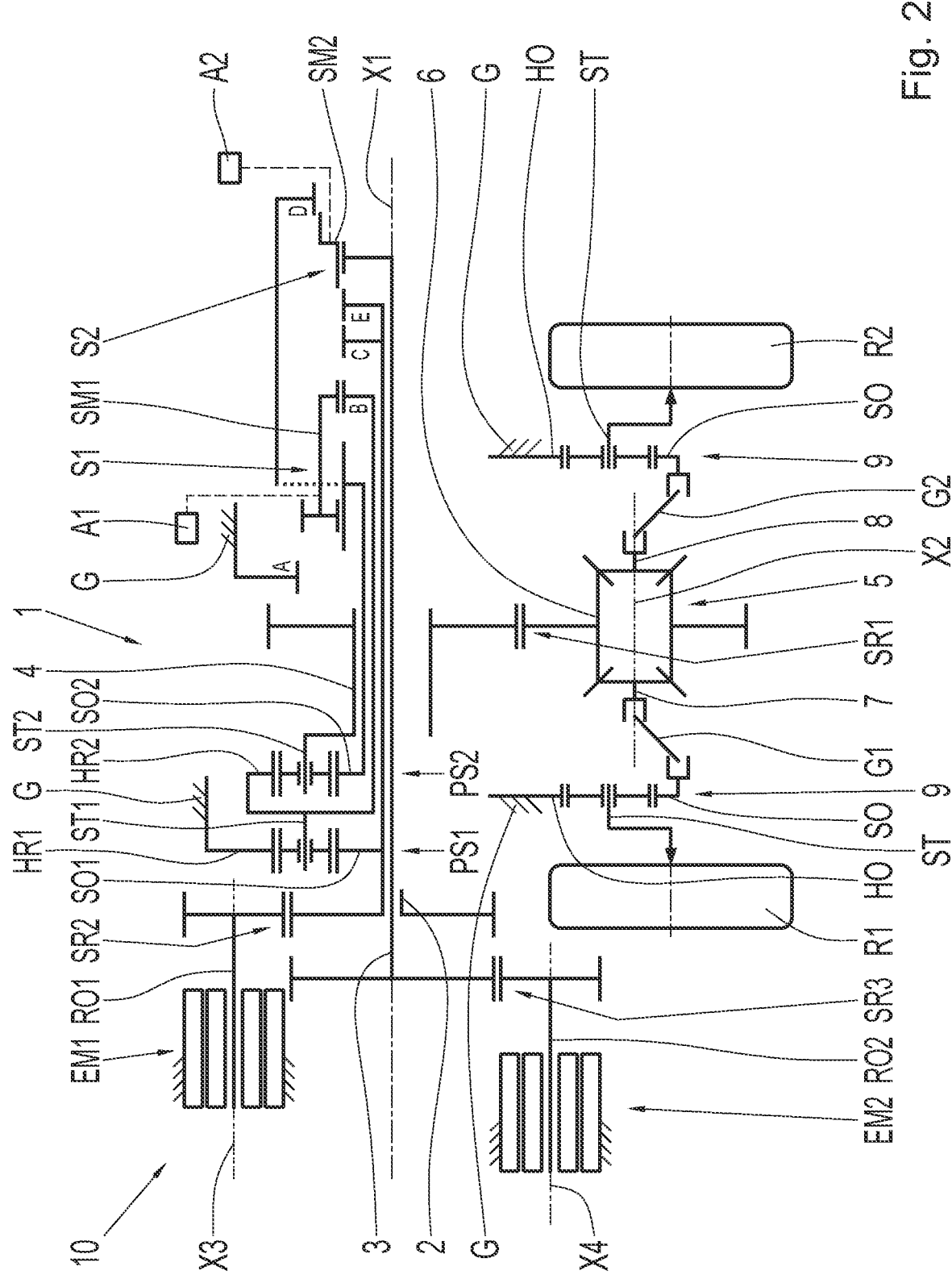
FIG. 2: A greatly abstracted schematic view of the drive axle with the drive unit according to the invention, shown in FIG. 1.

FIG. 1 shows a vehicle 100 according to the invention, which in this case is in the form of an electric utility vehicle and comprises a first vehicle axle 101 and a second vehicle axle 102, wherein the first vehicle axle 101 comprises a drive unit 10 according to the invention which is shown in greater detail in FIG. 2. In this case the first vehicle axle 101 is a front axle, but it can alternatively be a rear axle of the vehicle 100. Moreover, the vehicle 100 can have further vehicle axles. On the first vehicle axle 101 are arranged to rotate two drive wheels R1 and R2, whereas on the second vehicle axle 102 two wheels R3, R4 are mounted to rotate. The drive unit 10 is arranged fixed to the chassis of the vehicle 100 and comprises a first electric machine EM1, a second electric machine EM2, a differential 5 and a transmission 1, the differential 5 being arranged with its axis parallel to the two electric machines EM1, EM2 and the transmission 1. A transmission output shaft 4 of the transmission 1 is drivingly connected to the differential input 6 by a first spur gear stage SR1.

FIG. 2 shows the drive axle with the drive unit 10 according to the invention, as shown in FIG. 1. The electric drive axle comprises the two drive wheels R1, R2, the first electric machine EM1 with a first rotor shaft R01, the second electric machine EM2 with a second rotor shaft RO2, the transmission 1 and the differential 5. The transmission 1 comprises a first shifting unit S1 with a first shifting element A, a second shifting element B and a third shifting element C. In addition, the transmission 1 comprises a second shifting unit S2 with a fourth shifting element D and a fifth shifting element E. Between the two drive wheels R1, R2 is arranged the differential 5 in the form of an axle differential, with a differential input 6 in the form of a differential cage, and two differential output shafts 7 and 8. The differential 5 is arranged with its axis parallel to the two electric machines EM1, EM2 and the transmission 1, and the transmission output shaft 4 of the transmission 1 is drivingly connected to the differential input 6 by way of a first spur gear stage SR1. The first spur gear stage SR1 comprises a gearwheel arranged rotationally fixed on the transmission output shaft 4, which meshes with a gearteeth formed rotationally fixed on the differential input 6, and so produces an axial offset between a rotation axis X1 of the transmission 1 and a rotation axis X2 of the differential 5. The size of the offset can be adapted by way of the gearwheel diameter of the first spur gear stage S1, so that the transmission 1 can be positioned freely in the tangential direction around the rotation axis X2 of the differential 5.

The transmission 1 is designed as a three-gear transmission and comprises two planetary gearsets PS1, PS2 coupled to one another. The two planetary gearsets PS1, PS2, of which for simplicity only the upper half is shown in each case, are arranged rotation-symmetrically relative to the rotation axis X1 of the transmission 1. The first planetary gearset PS1 comprises a first sun gear shaft SO1, a first web shaft ST1, and a first ring gear shaft HR1 fixed on the housing. The second planetary gearset PS2 comprises a second sun gear shaft SO2, a second web shaft ST2, and a second ring gear shaft HR2, which latter is connected rotationally fixed to the first web shaft ST1 and therefore forms a coupling shaft between the two planetary gearsets PS1, PS2. The first sun gear shaft SO1 is connected rotationally fixed to a first transmission input shaft 2 of the transmission 1. The second web shaft ST2 is connected rotationally fixed to the transmission output shaft 4, which drives the differential 5 by way of the first spur gear stage SR1.

The first electric machine EM1 is drivingly connected via a second spur gear stage SR2 to the first transmission input shaft 2. The second spur gear stage SR2 comprises a gearwheel arranged rotationally fixed on the first transmission input shaft 2, which meshes with gearteeth formed rotationally fixed on the rotor shaft RO1 of the first electric machine EM1 and produces an axial offset between the rotation axis of the transmission 1 and a rotation axis X3 of the first electric machine EM1. The size of the said axial offset can be adapted by way of the gearwheel diameter of the second spur gear stage SR2, so that the first electric machine EM1 can be positioned freely around the rotation axis X1 of the transmission 1 in the tangential direction.

The second electric machine EM2 is drivingly connected to the second transmission input shaft 3 by way of a third spur gear stage SR3. The third spur gear stage SR3 comprises a gearwheel arranged rotationally fixed on the second transmission input shaft 3, which meshes with gearteeth formed rotationally fixed on the rotor shaft RO2 of the second electric machine EM2 and produces an axial offset between the rotation axis X1 of the transmission 1 and a rotation axis X4 of the second electric machine EM2. The size of the axial offset can be adapted by way of the gearwheel diameter of the third spur gear stage SR3, so that the second electric machine EM2 can be positioned freely around the rotation axis X1 of the transmission 1 in the tangential direction.

In the present case the two electric machines EM1, EM2 are a distance apart from one another in the circumferential direction and with their axes parallel to one another and to the transmission 1. Thus, the two electric machines EM1, EM2 have different rotation axes X3, X4. The second spur gear stage SR2 and the third spur gear stage SR3 are arranged axially adjacent to one another. The two electric machines EM1, EM2 extend in the axial direction away from the transmission 1. Alternatively, at least one of the two electric machines EM1, EM2 can extend in the axial direction toward the transmission 1, in particular being arranged axially in such manner that it is positioned radially outside one or both of the shifting units S1, S2, whereby the drive unit 10 can be axially more compact.

Between the differential 5 and the drive wheels R1, R2 fixed gear ratio steps 9 are in each case arranged in the power flow, in this case in the form of a planetary gearset arranged on the right and a planetary gearset arranged on the left, in a mirror-image relationship to one another. The respective differential output shaft 7, 8 is drivingly connected via an associated joint shaft G1, G2 to a respective sun gear shaft SO of the gear ratio step 9 concerned. In that way relative movements between the respective drive wheel R1, R2 and the drive unit 10 fixed on the chassis can be compensated. A respective ring gear shaft HR of the gear ratio step 9 concerned is held immobile, while the drive output takes place by way of a respective web shaft ST of the gear ratio step 9 concerned. Accordingly, the web shafts ST of the gear ratio steps 9 constitute drive output shafts which drive the drive wheels R1, R2.

By means of the first shifting unit S1 three gears can be engaged. To engage the first gear, the second sun gear shaft SO2 is connected rotationally fixed by means of the first shifting element A to a rotationally fixed component G of the transmission 1 in the form of a housing, i.e. immobilized. Thus, the two planetary gearsets PS1, PS2 rotate with fixed gear ratios which, when multiplied by one another, give the gear ratio of the first gear.

The second shifting element B, by which the second gear is engaged, blocks the second planetary gearset PS2 whereby basically two of the three shafts SO2, HR2, ST2 of the second planetary gearset PS2 can be coupled to one another. In this case, by means of the second shifting element B the second sun gear shaft SO2 is connected rotationally fixed to the second ring gear shaft HR2. Due to this blocking the second planetary gearset PS2 rotates as a bock, i.e. with a gear ratio of 1:1, so that the gear ratio of the second gear is given by the fixed gear ratio of the first planetary gearset PS1.

The third shifting element, by which the third gear is engaged, connects the second sun gear shaft SO2 to the first sun gear shaft SO1. This produces a dual coupling of the first and second planetary gearsets PS1, PS2. This results in superimposed operation of the first and second planetary gearsets PS1, PS2 with a lower gear ratio for the third gear.

The shifting elements A, B, C are preferably in the form of unsynchronized claws, although basically frictional, synchronized shifting elements can also be used for the shifting functions described. Between the three shift positions in which either the shifting element A, or the shifting element B, or the shifting element C is closed, the transmission 1 has two neutral positions in which the first electric machine EM1 can be decoupled from the transmission 1. This makes so-termed coasting operation possible, i.e. free rolling of the vehicle 100 without losses in the co-rotating first electric machine EM1.

As indicated above, the second sun gear shaft SO2 of the second planetary gearset PS2 is involved in all the shifting positions of the first shifting unit S1. Accordingly the shifting elements of the first shifting unit S1, i.e. the first, second and third shifting element A, B, C, can be integrated in a single sliding sleeve SM1 which, in all the shift positions, is connected rotationally fixed to the second sun gear shaft SO2. This first sliding sleeve SM1 is actuated by a first actuator A1. Since gears one to three are engaged in sequence by moving the first sliding sleeve SM1 in an axial direction in each case through a respective neutral position, this allows the possibility of synchronizing the shifting elements.

The second electric machine EM2 can be engaged or disengaged by means of the second shifting unit S2, whereby in a neutral position of the second shifting unit S2 the second transmission input shaft 3 and thus too the second electric machine EM2 is decoupled from the drive-train. Thus, the second shifting unit S2 is designed as a coupling device. The second shifting unit S2 comprises two shifting elements, namely, the fourth shifting element D and the fifth shifting element E, which are designed as coupling elements. By means of the fifth shifting element E of the second shifting unit S2, the second transmission input shaft 3 is connected rotationally fixed to the first transmission input shaft 2. In that way the rotor RO2 of the second electric machine EM2 is coupled to the rotor RO1 of the first electric machine EM1. Due to this coupling of the two rotors RO1, RO2 the two electric machines EM1, EM2 run at the same rotation speed. Thus, the second electric machine EM2 increases the drive power, which can be doubled if the electric machines EM1, EM2 are of identical design.

By means of the fourth shifting element D of the second shifting unit S2, the second transmission input shaft 3 is connected rotationally fixed to the second sun gear shaft SO2, this coupling connection being made possible by an intervention in the first sliding sleeve SM1 of the first shifting unit S1. In that way the power of the second electric machine EM2 flows along a different power path in the transmission 1, such that the power flows of the two electric machines EM1, EM2 are superimposed. Consequently, by means of the fourth shifting element D of the second shifting unit S2 traction force support while shifting is achieved, so that powershifts are made possible with the transmission 1. For example if during a gearshift, i.e. the engagement of a new gear, the power flow from the first electric machine EM1 is interrupted, then a torque is applied to the second sun gear shaft SO2 of the second planetary gearset PS2 by the second electric machine EM2, which maintains the traction force in the transmission output shaft 4 or the second web shaft ST2. Shifting without a break in the traction force is also known as a powershift process, which will be described in greater detail below.

The powershift process starts on the assumption that the first electric machine EM1 is designed to be the main drive machine. To support the shifts the second electric machine EM2 is connected to the second sun gear shaft SO2 as a preparative measure. In what follows the shifting process from the first to the second gear will be described, wherein to begin with the first shifting element A of the first shifting unit S1 is opened and then the second shifting element B of the first shifting unit S1 is closed. Starting from the situation that the second electric machine EM2 has previously been connected to the first transmission input shaft 2, i.e. both electric machines EM1, EM2 are driving together, first of all the load on the second electric machine EM2 is reduced, i.e. the fifth shifting element E of the second shifting unit S2 is opened and the fourth shifting element D is synchronized with the second electric machine EM2, i.e. in this case braked to zero rotation speed. Then, the fourth shifting element D is closed. The second electric machine EM2 is then connected to the second sun gear shaft SO2. Thereafter, a torque is built up by the second electric machine EM2 so that the first shifting element A, which acts as a brake, is unloaded. If the second electric machine EM2 cannot apply a large enough torque, the torque of the first electric machine EM1 is correspondingly reduced. The first shifting element A is then opened.

The torques of the first and second electric machines EM1, EM2 are controlled or regulated in such manner that the rotation speed of the second electric machine EM2 increases and the rotation speed of the first electric machine EM1 decreases. For that purpose, the torque of the second electric machine EM2 is preferably increased and at the same time the torque of the first electric machine EM1 is reduced. The target rotation speed of the second sun gear shaft SO2, which corresponds to the rotation speed of the second electric machine EM2, is the rotation speed of the second ring gear shaft HR2 so that the second shifting element B becomes synchronous. As soon as the second shifting element B is synchronized it can be closed. Now the torques of the first and second electric machines EM1, EM2 can be divided arbitrarily since a fixed gear, namely the second gear, is engaged. If necessary, the second electric machine EM2 can be decoupled from the second sun gear shaft SO2. If full drive-power is desired, the second electric machine EM2 can also be connected to the first transmission input shaft 2 or the first sun gear shaft SO1. The powershift process when shifting from the second to the third gear, wherein the second shifting element B is opened and the third shifting element C is closed, proceeds analogously to the shifting process from the first to the second gear as described above. Downshifts take place analogously but in the reverse direction of the rotation speeds in the first and second electric machines EM1, EM2.

As stated above, the second transmission input shaft 3 is involved in all the shift positions of the second shifting unit S2. Accordingly, both shifting elements of the second shifting unit S2, i.e. the fourth and fifth shifting elements D and E, can be integrated in a single siding sleeve SM2 which in the shift positions is connected rotationally fixed to the second transmission input shaft 3. As shown in FIG. 2 the second sliding sleeve SM2 is actuated, i.e. moved axially, by a second actuator A2. A neutral position is arranged axially between the two shift positions of the second sliding sleeve SM2, whereby in the neutral position the second sliding sleeve SM2 is connected rotationally fixed only to the second transmission input shaft 3 so that the latter is decoupled.

Figure 3:
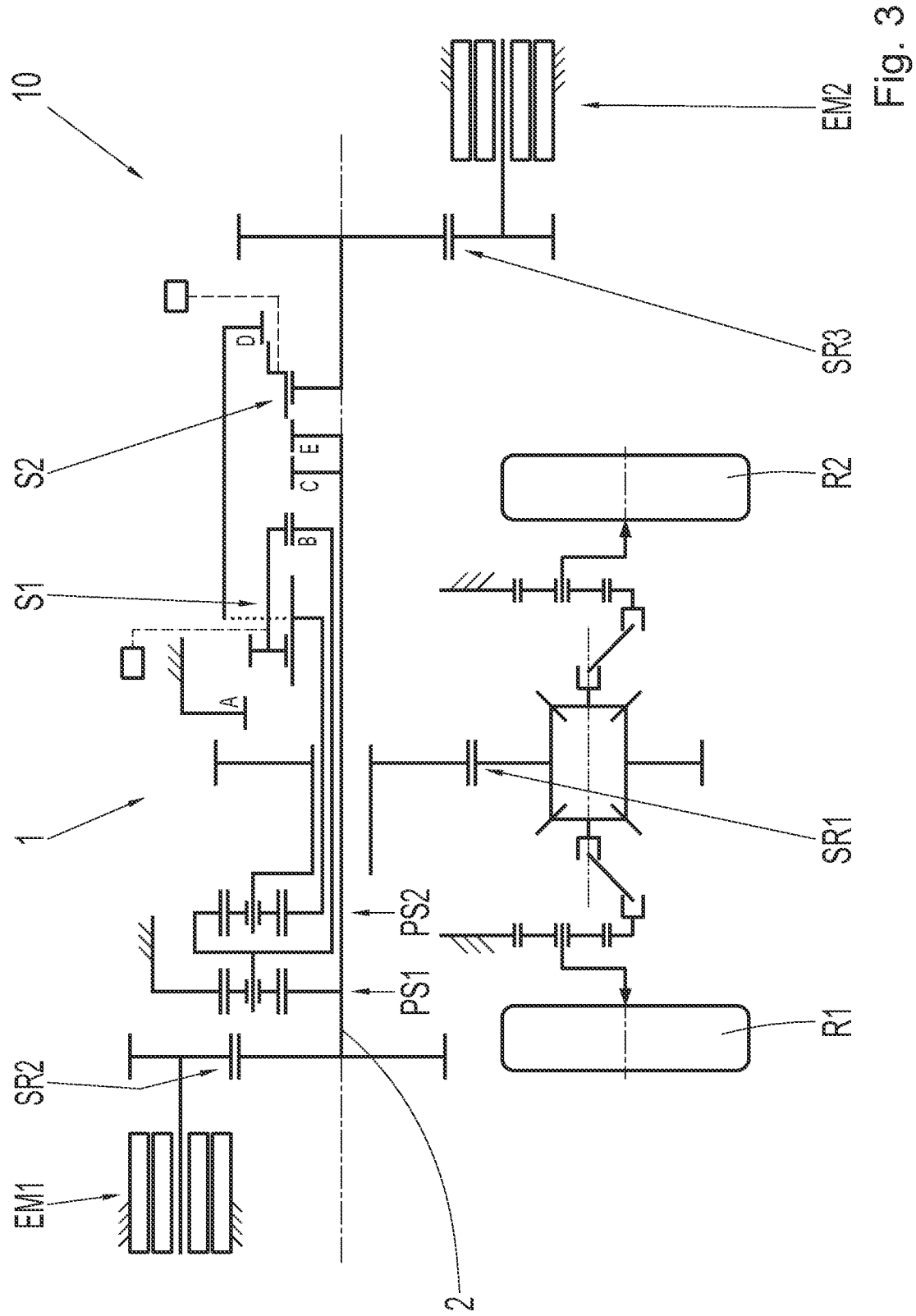
FIG. 3: A greatly abstracted schematic view of a drive axle with a drive unit according to the invention, according to a second embodiment.

FIG. 3 shows a second embodiment of a drive axle with a drive unit 10 according to the invention. The drive axle in FIG. 3 corresponds essentially to the drive axle in FIG. 2, the difference between these two embodiments being in the arrangement of the third spur gear stage SR3 and the second electric machine EM2. In this case the third spur gear stage SR3 is positioned on the right-hand side of the transmission 1 adjacent to the shifting units S1, S2. In other words, the second spur gear stage SR2 is arranged on a first axial end section of the transmission 1, whereas the third spur gear stage SR3 is arranged on an opposite, second axial end section of the transmission 1. Thus, the second and third spur gear stages SR2, SR3 are as far apart as possible and the first spur gear stage SR1 is arranged axially between the second and third spur gear stages SR2, SR3. This has the advantage that the first transmission input shaft 2 does not necessarily have to be in the form of a hollow shaft, but it can be a solid shaft as shown in this case. Since the electric machines EM1, EM2 are arranged on different sides of the planetary gearsets PS1. PS2, in particular the freedom of arrangement for the tangential positioning of the two electric machines EM1, EM2 is greater. In other respects, the example embodiment according to FIG. 3 corresponds with the example embodiment of FIG. 2, to which reference is made.

Figure 4:
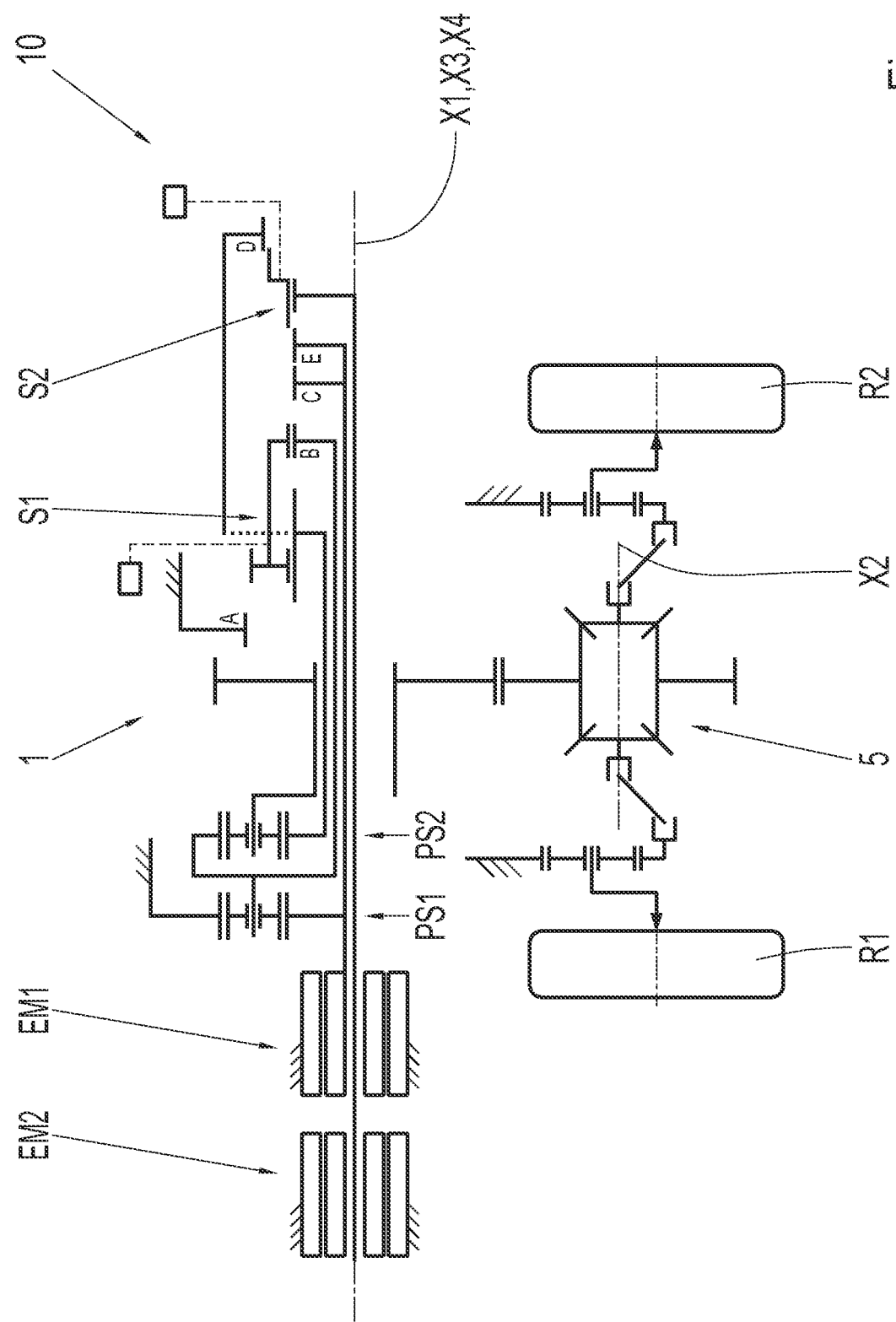
FIG. 4: A greatly abstracted schematic view of a drive axle with a drive unit according to the invention, according to a third embodiment.

FIG. 4 shows a third embodiment of a drive axle with a drive unit 10 according to the invention. The drive axle according to FIG. 4 corresponds essentially to the drive axle in FIG. 2, the difference between these two example embodiments being in the arrangement and connection of the two electric machines EM1. EM2, because no second and third spur gear stages are provided. The rotation axes X3, X4 of the two electric machines EM1, EM2 coincide with the rotation axis X1 of the transmission 1 and are therefore identical. Thus, the two electric machines EM1, EM2, the two planetary gearsets PS1, PS2 and the two shifting units S1, S2 are arranged on a common rotation axis which is parallel to the rotation axis X2 of the differential 5, and indeed positioned in the axial direction in such manner that the two planetary gearsets PS1, PS2 are axially between the two shifting units S1, S2 and the two electric machines EM1, EM2. In that way the drive unit 10 is more compact in the radial direction. The entire axial offset is produced by the first spur gear stage SR1. Furthermore, an offset assembly position of the second electric machine EM2 relative to the first electric machine EM1 according to FIG. 3 is possible, i.e. in such manner that the first electric machine EM1 is arranged on one side of the transmission 1 and the second electric machine EM2 is arranged on the other side of the transmission 1. In other respects, the example embodiment according to FIG. 4 corresponds with the example embodiment of FIG. 2, to which reference is made.

Figure 5:
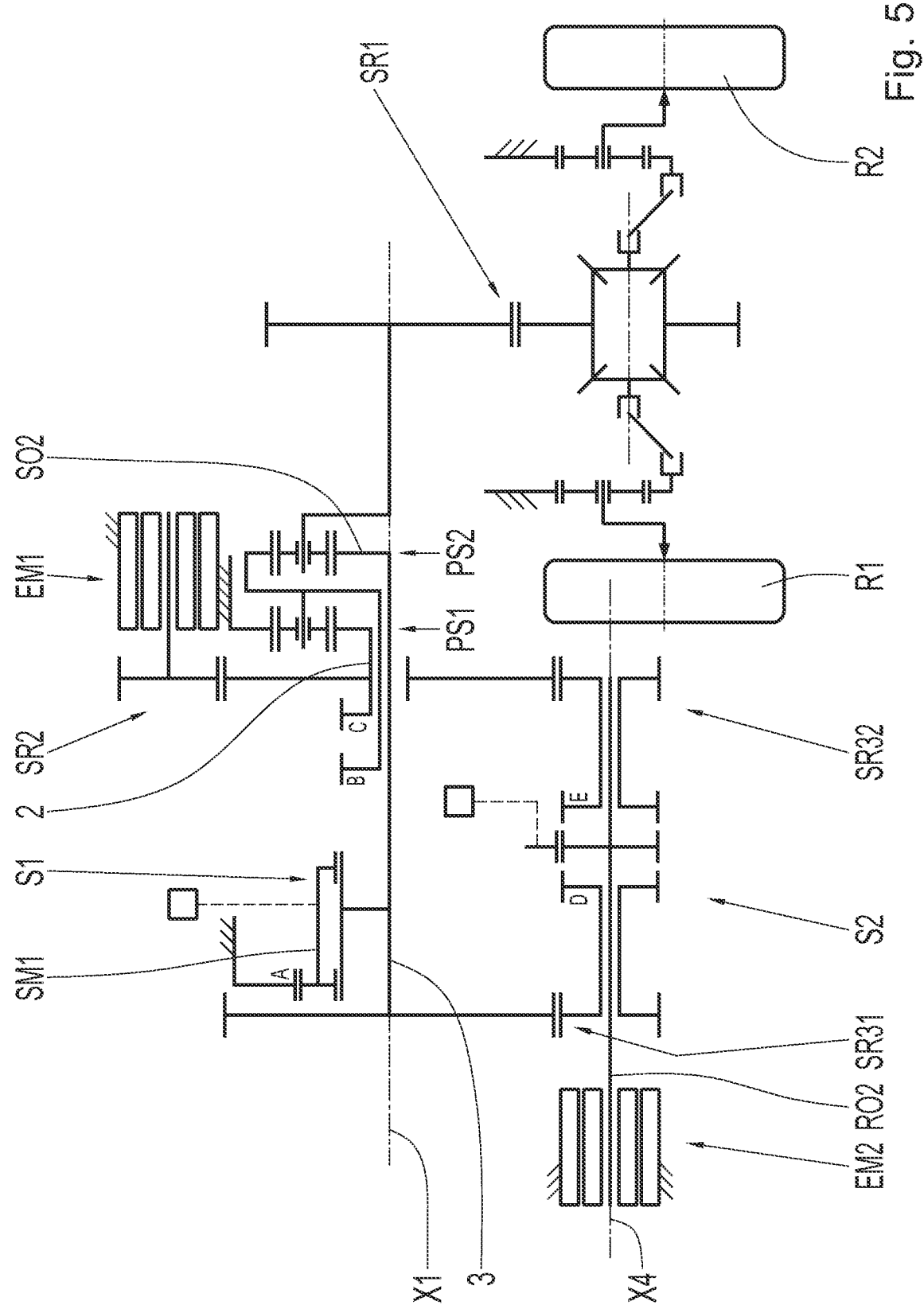
FIG. 5: A greatly abstracted schematic view of a drive axle with a drive unit according to the invention, according to a fourth embodiment.

FIG. 5 shows a fourth embodiment of a drive axle with a drive unit 10 according to the invention. The drive axle in FIG. 5 corresponds essentially to the drive axle in FIG. 2, the difference between these two embodiments being in the arrangement of the two shifting units S1, S2, such that in particular the intervention in the first sliding sleeve SM1 of the first shifting unit S1 is dispensed with. In this case, the second shifting unit S2 is arranged on the rotation axis X4 of the second electric machine EM2, while the first transmission input shaft 2 and the two planetary gearsets PS1, PS2 are arranged with their axes parallel thereto on the rotation axis X1 of the transmission 1. The second electric machine EM2 can be drivingly connected to the second transmission input shaft 3 by means of a third spur gear stage SR31 and to the first transmission input shaft 2 by means of a fourth spur gear stage SR32. The second shifting unit S2 is arranged axially between the third spur gear stage SR31 and the fourth spur gear stage SR32. Likewise, the first shifting unit S1 is arranged axially between the third spur gear stage SR31 and the fourth spur gear stage SR32, but with its axis parallel to the second shifting unit S2 and coaxially with the two planetary gearsets PS1, PS2. The function of the first shifting unit S1 is the same as in FIG. 2.

In contrast, the function of the second shifting unit S2 is different, in that by means of the fourth shifting element D of the second shifting unit S2 the second rotor shaft RO2 of the second electric machine EM2 can be drivingly connected by means of the third spur gear stage SR31 to the second transmission input shaft 3, whereas by means of the fifth shifting element E of the second shifting unit S2 the second rotor shaft RO2 of the second electric machine EM2 can be drivingly connected by means of the fourth spur gear stage SR32 to the first transmission input shaft 2. In a neutral position of the second shifting unit S2 the rotor shaft RO2 of the second electric machine EM2 can be decoupled. In other words, superimposition operation is achieved in that when the shifting element D is closed, the drive power of the second electric machine EM2 is converted by way of the third spur gear stage SR31 and transferred to the second transmission input shaft 3, with the second transmission input shaft 3 connected rotationally fixed to the second sun gear shaft SO2 of the second planetary gearset PS2. Furthermore, the two electric machines EM1, EM2 are coupled in that the drive power of the second electric machine EM2 is converted by the fourth spur gear stage SR32 and transferred to the first transmission input shaft 2. In this case the second spur gear stage SR2 and the fourth spur gear stage SR32 are advantageously integrated in one another, so that they use a single gearwheel on the first transmission input shaft 2 together. Alternatively, the second and fourth spur gear stages SR2, S32 can each have a gearwheel of its own on the first transmission input shaft 2. In other respects, the example embodiment according to FIG. 5 corresponds to the example embodiment in FIG. 2, to which reference is made.

INDEXES

1 Transmission
2 First transmission input shaft
3 Second transmission input shaft
4 Transmission output shaft
5 Differential
6 Differential input
7 Differential output shaft
8 Differential output shaft
9 Gear ratio step
10 Drive unit
100 Vehicle
101 First vehicle axle
102 Second vehicle axle
R1 Drive wheel
R2 Drive wheel
R3 Wheel
R4 Wheel
EM1 First electric machine
EM2 Second electric machine
PS1 First planetary gearset
SO1 First sun gear shaft
HR1 First ring gear shaft ST1 First web shaft
PS2 Second planetary gearset
SO2 Second sun gear shaft
HR2 Second ring gear shaft
ST2 Second web shaft
SO Sun gear shaft
HR Ring gear shaft
ST Web shaft
S1 First shifting unit
SM1 First sliding sleeve
A First shifting element
B Second shifting element
C Third shifting element
S2 Second shifting unit
SM2 Second sliding sleeve
E Fourth shifting element #
D Fifth shifting element
SR1 First spur gear stage
SR2 Second spur gear stage
SR3 Third spur gear stage
SR31 Third spur gear stage
SR32 Fourth spur gear stage
G Rotationally fixed component
G1 Joint shaft
G2 Joint shaft
A1 First actuator
A2 Second actuator
X1 Rotation axis of the transmission
X2 Rotation axis of the differential
X3 Rotation axis of the first electric machine
X4 Rotation axis of the second electric machine

The invention claimed is:
1. A drive unit for a drive axle of a vehicle, comprising:
a first electric machine;
a second electric machine;
a differential with a differential input and two differential output shafts configured to be drivingly connected each to a respective drive wheel of the drive axle; and
a transmission comprising a first transmission input shaft and configured for connecting to the first electric machine, a second transmission input shaft configured for connecting to the second electric machine, a transmission output shaft configured for connecting to the differential, a first shifting unit with a first shifting element a second shifting element and a third shifting element, a second shifting unit with a fourth shifting element and a fifth shifting element, and two planetary gearsets coupled to one another;
wherein:
the first planetary gearset comprises a first sun gear shaft, first ring gear shaft, and a first web shaft;
the second planetary gearset comprises a second sun gear shaft, a second ring gear shaft, and a second web shaft;
the first web shaft is connected rotationally fixed to the second ring gear shaft;
the first sun gear shaft is connected rotationally fixed to the first transmission input shaft;
the first ring gear shaft is fixed and immobilized on a rotationally fixed component;
the second web shaft is connected rotationally fixed to the transmission output shaft;
by means of the first shifting element the second sun gear shaft is configured to be connected rotationally fixed to a rotationally fixed component;
by means of the second shifting element two of the three shafts of the second planetary gearset are configured to be connected rotationally fixed to one another;
by means of the third shifting element the second sun gear shaft is configured to be connected rotationally fixed to the first transmission input shaft; and
the differential is arranged with its axis parallel to the two electric machines and to the transmission, and the transmission output shaft is drivingly connected to the differential input by means of a first spur gear stage.

2. The drive unit according to claim 1, wherein the first electric machine is drivingly connected to the first transmission input shaft by means of a second spur gear stage.

3. The drive unit according to claim 2, wherein the second electric machine is drivingly connected to the second transmission input shaft by means of a third spur gear stage.

4. The drive unit according to claim 3, wherein the second spur gear stage and the third spur gear stage are arranged axially adjacent to one another.

5. The drive unit according to claim 3, wherein the second spur gear stage is arranged on a first axial end section of the transmission, and the third spur gear stage is arranged on a second, opposite axial end section of the transmission.

6. The drive unit according to claim 1, wherein by means of the fourth shifting element of the second shifting unit the second transmission input shaft can be connected rotationally fixed to the second sun gear shaft, wherein by means of the fifth shifting element of the second shifting unit the second transmission input shaft can be connected rotationally fixed to the first transmission input shaft, and in a neutral position of the second shifting unit the second transmission input shaft can be decoupled.

7. The drive unit according to claim 1, wherein by means of the fourth shifting element of the second shifting unit the second electric machine can be drivingly connected via a third spur gear stage to the second transmission input shaft, wherein by means of the fifth shifting element of the second shifting unit the second electric machine can be drivingly connected via a fourth spur gear stage to the first transmission input shaft, and in a neutral position of the second shifting unit the rotor shaft of the second electric machine can be decoupled.

8. The drive unit according to claim 7, wherein the second shifting unit and the second electric machine have a common rotation axis, and the first transmission input shaft and the two planetary gearsets are arranged with their axes parallel thereto.

9. The drive unit according to claim 1, wherein the two electric machines, the two planetary gearsets and the two shifting units are arranged axially adjacent to one another on a common rotation axis in such manner that the two planetary gearsets are positioned axially between one of the two shifting units and one of the two electric machines.

10. The drive unit according to claim 1, wherein the two electric machines have different rotation axes.

11. The drive unit according to claim 1, wherein the first shifting unit comprises a first sliding sleeve connected rotationally fixed to the second transmission input shaft, and the first sliding sleeve can be moved by a first actuator to the required shift position.

12. The drive unit according to claim 1, wherein the second shifting unit comprises a second sliding sleeve connected rotationally fixed to the second transmission input shaft, and the second sliding sleeve can be moved by a second actuator to the required shift position.

13. The drive unit according to claim 1, wherein to engage the first gear the first shifting element can be actuated, wherein to engage the second gear the second shifting element can be actuated, and to engage the third gear the third shifting element can be actuated.

14. The drive unit according to claim 1, further comprising two fixed gear ratio steps for the driving connection of the respective differential output shaft to the drive wheel concerned.

15. A vehicle comprising a drive axle with two drive wheels and a drive unit according to claim 1, wherein the drive unit is arranged fixed on the chassis of the vehicle and the respective drive wheel of the drive axle is drivingly connected to the differential by means of an associated joint shaft.

* * * * *